Nov. 1, 1927.

E. FEJES

PIPE JOINT

Filed Sept. 5, 1923

1,647,217

E. Fejes, Inventor

By: Marks & Clerk, Attys.

Patented Nov. 1, 1927.

1,647,217

UNITED STATES PATENT OFFICE.

EUGEN FEJES, OF BUDAPEST, HUNGARY.

PIPE JOINT.

Application filed September 5, 1923, Serial No. 661,111, and in Hungary September 20, 1921.

This invention has for its object to provide an improved pipe joint for connecting together the common pipes of the cylinders of internal combustion engines, more especially cylinders that are not cast together in one piece, but are made separately and then connected together by jointing together parts that extend in common through all the cylinders such as for instance the engine suction pipe.

In the hitherto usually adopted constructions of the welds, the heating is very liable to produce distortion and injurious stresses in the parts welded together.

These drawbacks are prevented according to this invention which consists in the use of comparatively thin sheet metal and providing resilient connections between adjacent sheet metal sections of the common part (for instance the engine suction pipe), said adjacent sections being then welded at the edge.

These resilient connections allow the connected sections to expand freely or take up any forced permanent alteration of shape or position without structural damage either to the sections or the welded joints connecting them.

Figure 1:
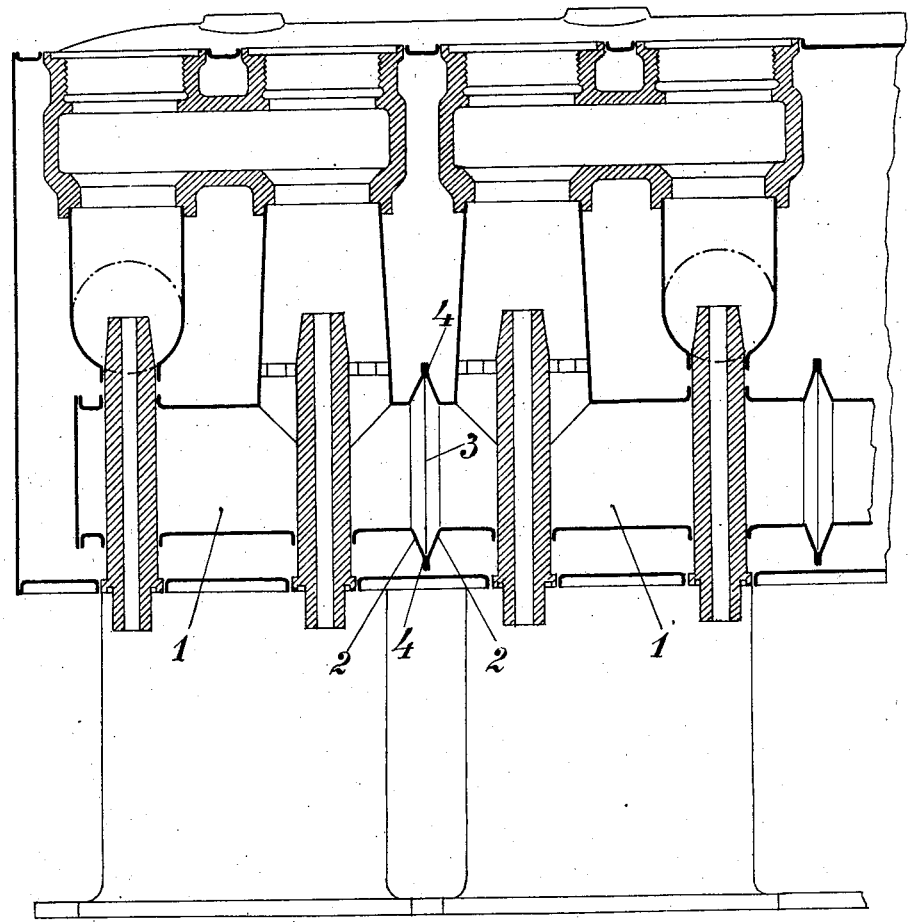
Figure 2:
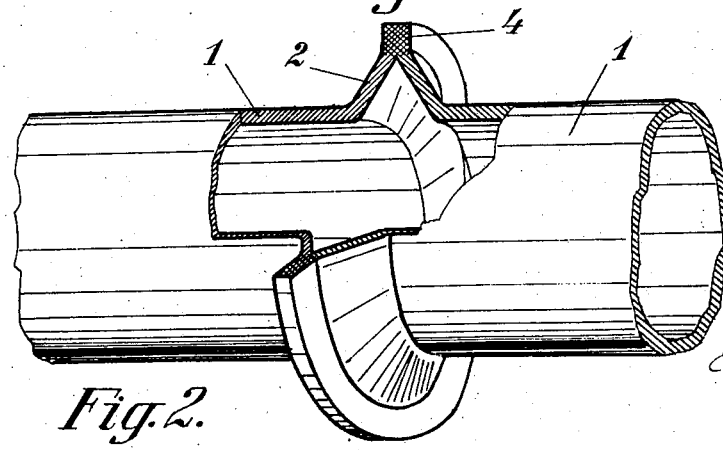

One embodiment of the present improvements is illustrated by way of example in their application to an internal combustion engine in the accompanying drawing in which Fig. 1 is a diagrammatic vertical longitudinal section taken through the engine suction pipe of the upper portion of the engine and Fig. 2 is a fragmentary perspective view of two adjacent sections.

In the illustrated example, the suction pipe is built up by an appropriate number of the sheet metal sections 1, depending upon the number of engine cylinders 1ª and the abutting ends of adjacent sections of this suction pipe are outwardly beaded or flanged and brought together so as to form flanges 2, 2 meeting at an acute internal angle and extending beyond their meeting point in the form of welding fillets 4, 4 which are welded together on their outer periphery.

The improved pipe structure including the welded joint between the sections thereof permits of placing any desired number of engine cylinders side by side and then connecting together a corresponding number of sections to provide inlet and exhaust connections common to the several cylinders.

The advantage of this improved joint consists in the resiliency of the welded joint which is able to take injurious strains and stresses, and likewise all alterations in shape that may occur after the welding so that they cannot reach and damage the other parts.

The improved constitution of the welded joint allows of placing any desired plurality of engine cylinders side by side and then connecting their connections by welding their common pipes together.

What I claim is:—

In a pipe structure, two adjacent sheet metal pipe sections, integral flanges on the ends of the sections meeting together at an acute internal angle, and welding fillets constituting continuations of said flanges, said welding fillets being arranged in direct engagement and welded together around their outer peripheries whereby a resilient welded joint is formed between said two adjacent sections.

In testimony whereof I have affixed my signature.

EUGEN FEJES.